(12) United States Patent
Rieche et al.

(10) Patent No.: US 6,935,751 B2
(45) Date of Patent: Aug. 30, 2005

(54) PROJECTION ARRANGEMENT FOR CORRECTING FOR IMAGE DISTORTIONS

(75) Inventors: Gerd Rieche, Jena (DE); Gudrun Schröter, Jena (DE); Ralph Mende, Jena (DE)

(73) Assignee: Carl Zeiss Jena GmbH, Jena (DE)

(*) Notice: Subject to any disclaimer, the term of this patent is extended or adjusted under 35 U.S.C. 154(b) by 0 days.

(21) Appl. No.: 10/479,930

(22) PCT Filed: Jun. 4, 2002

(86) PCT No.: PCT/EP02/06127
§ 371 (c)(1),
(2), (4) Date: Dec. 5, 2003

(87) PCT Pub. No.: WO02/100100
PCT Pub. Date: Dec. 12, 2002

(65) Prior Publication Data
US 2004/0150797 A1 Aug. 5, 2004

(30) Foreign Application Priority Data
Jun. 6, 2001 (DE) .................. 201 09 394 U

(51) Int. Cl.⁷ .............................. G03B 21/14
(52) U.S. Cl. ....................................... 353/69
(58) Field of Search ................... 3532/69, 70; 348/771

(56) References Cited

U.S. PATENT DOCUMENTS

| | | |
|---|---|---|
| 6,179,426 B1 | 1/2001 | Rodriguez, Jr. et al. |
| 6,520,646 B2 * | 2/2003 | Rodriguez et al. ............. 353/69 |
| 6,536,907 B1 | 3/2003 | Towner et al. ............... 365/121 |
| 6,592,228 B1 | 7/2003 | Kawashima et al. ........ 353/101 |

FOREIGN PATENT DOCUMENTS

| | | |
|---|---|---|
| DE | 299 18 535 U 1 | 2/2000 |
| DE | 299 18 612 U 1 | 3/2000 |
| EP | 0 773 678 A2 | 5/1997 |
| EP | 0 847 205 A2 | 6/1998 |
| EP | 1 058 452 A1 | 12/2000 |
| EP | 1 115 105 A1 | 7/2001 |
| EP | 1 207 691 A2 | 5/2002 |
| JP | 62296514 | 12/1987 |
| JP | 3113432 | 5/1991 |
| JP | 4214522 | 8/1992 |

OTHER PUBLICATIONS

International Search Report.
"Correcting Distortions in Digital Displays and Projectors Using Real–Time Digital Image Warping," J. Goel, *SID 99 Digest*, pp. 238–241 (1999).

* cited by examiner

*Primary Examiner*—William C. Dowling
(74) *Attorney, Agent, or Firm*—Patterson, Thuente, Skaar & Christensen, P.A.

(57) ABSTRACT

A projection arrangement is provided, comprising a light source (1), a light modulator (4), which is arranged following the light source (1) and onto which light from the light source (1) may be directed, said light being modulated by the light modulator (4) under the control of a control device (5) on the basis of predetermined image data, in order to generate an image, and projection optics (6) arranged following the light modulator (4) for projecting said image onto a projection surface (9), wherein the control device (5) comprises a control unit (15) and a correcting unit (16), said correcting unit (16) pre-distorting the predetermined image data such that a non-linear distortion caused by the projection optics (6) is compensated, and said control unit (15) controls the light modulator (4) by means of the pre-distorted image data.

16 Claims, 4 Drawing Sheets

PROJECTION ARRANGEMENT FOR CORRECTING FOR IMAGE DISTORTIONS

FIELD OF THE INVENTION

The invention relates to a projection arrangement comprising a light source, a light modulator, arranged following the light source, onto which light from the light source may be directed, said light being modulated by said light modulator under the control of a control device on the basis of predetermined image data so as to generate an image, and projection optics arranged following said light modulator for projecting said image onto a projection surface.

BACKGROUND

In such a projection arrangement, the projection arrangement is preferably embodied such that the projected image has as little distortion as possible. This leads to complex projection optics. If said projection optics are at a relatively small distance from the projection surface, the projection optics are preferably designed as wide-angle optics, so that the image may still be projected onto the projection surface in the desired size. However, such wide-angle optics comprise several lenses having a large diameter and large curvatures, so that the optics are relatively heavy. Further, the complexity required in order to impart the desired imaging properties to the wide-angle optics increases disproportionately as the lens diameters and lens curvatures increase, which makes the structure of the projection optics very complicated.

In view thereof, it is an object of the present invention to improve a projection arrangement of the aforementioned type such that it becomes smaller and more compact.

SUMMARY OF THE INVENTION

In a projection arrangement of the aforementioned type, this object is achieved in that the control device comprises a control unit and a correcting unit and that the correcting unit pre-distorts the predetermined image data such that a non-linear distortion caused by the projection optics is compensated, said control unit controlling the light modulator with the pre-distorted image data.

Since this makes it possible to electronically compensate non-linear distortions of the projection optics, clearly reduced optical requirements may be imposed on the projection optics. This leads to the advantage that the number of required lens elements may be reduced.

The possible reduction in the number of lenses facilitates manufacture of the projection optics, which leads, in particular, to a clear reduction in the costs of manufacture of the projection arrangement according to the invention, because especially the costs of manufacture of the projection optics constitute a large part of the total manufacturing costs.

Further, said reduction in the number of lenses allows a reduction in weight, so that the weight of the projection arrangement according to the invention may also be reduced. This is a big advantage, in particular with regard to the tendency toward providing projection arrangements which are as light as possible and, thus, easy to carry.

Further, it is also possible to allow for greater manufacturing tolerances for the lenses of the projection optics, because these errors can be compensated by the correcting unit. This, in turn, leads to an advantageous reduction in the costs of manufacture.

The correcting unit may be realized as hardware, software, or as a combination of both.

The pre-distortion by the correcting unit is preferably selected such that the non-linear optical distortions of the projection optics are compensated as completely as possible. As a result, the projected image is practically free from distortion.

In a preferred embodiment of the projection arrangement according to the invention, the projection optics have a residual distortion of $\geq 2\%$, preferably $\geq 10\%$, and of less than 50%, preferably less than 25%. In projection optics having such a residual distortion, an excellent compromise is found between the desire to employ projection optics which are as light and small as possible and the desire to minimize the loss in resolution caused by having to compress several areas of the image on the light modulator due to said pre-distortion.

In particular, the projection optics in the projection arrangement according to the invention are wide-angle optics having an angle of field of $\geq 35°$. Especially in such wide-angle optics, the effort required for optical compensation of imaging errors, so that the residual distortion is below a usual value of, for example, 2%, is extremely great, which is exactly what leads to the undesired heavy and expensive projection optics. Therefore, in the projection arrangement according to the invention, wherein the projection optics are wide-angle optics, the reduction in weight and costs of the projection optics due to the correcting unit allowing a greater residual distortion is particularly marked.

An advantageous embodiment of the projection arrangement according to the invention consists in that the light modulator comprises a rectangular image field (imaging area), which is decentered relative to the optical axis of the projection optics, said optical axis preferably still meeting the image field. In this case, the light modulator used is particularly preferably a tilting mirror matrix comprising a plurality of tilting mirrors arranged in lines and columns, which may be tilted back and forth between first and second tilted positions independently of each other. This arrangement of the light modulator advantageously makes sufficent space available for illumination or for optical elements for illumination in the projection arrangement according to the invention.

In particular, the light modulator in the projection arrangement according to the invention may comprise a rectangular image field comprising a plurality of image pixels, which are switchable to at least a first and a second setting and are controllable independently of each other, with the image point associated with an image pixel being a bright image point when the image pixel is switched to the first setting and being a dark image point when the image pixel is switched to the second setting, the correcting unit pre-distorting the image data in such a manner that the image pixels which are imaged by the projection optics on the projection surface outside of a predetermined rectangular field of projection are switched to the second setting by means of the control unit. This advantageously ensures that only a rectangular image, and not an image having distorted edges, is projected onto the projection surface.

In a further embodiment of the projection arrangement according to the invention, the light source is provided such that it alternately directs light of a first color and light of a second color onto the light modulator, allowing the light modulator to generate images having different colors. In particular, the light source may also direct light of more than two colors, e.g. red, green and blue, onto the light modulator. This allows the projection of multicolor images.

Further, it is possible to provide a separate light modulator for each color, in which case the light modulated by the light modulators, which is used for imaging, is superimposed by suitable optical means and supplied to the projection optics as one common beam.

The projection arrangement according to the invention may also be designed such that the correcting unit pre-distorts the predetermined image data for the first-color image and for the second-color image differently such that compensation for the transverse chromatic aberration of the projection optics is already included. Again, this simplifies the construction of the projection optics, thus enabling further savings in weight and costs. This may also be effected for more than two colors and is also applicable, in particular, to a construction wherein several light modulators (one for each color) are provided.

In an advantageous embodiment, the projection arrangement according to the invention is provided as a back projection arrangement, which may be arranged with a very small distance between the projection optics and the back projection surface, due to the electronic correction of the non-linear imaging errors of the projection optics, so that the back projection arrangement may be realized in a very compact manner. It is also possible, of course, to provide the projection arrangement according to the invention as a front projection arrangement. In this case, a very small distance from the projection surface to an the projection objective may be employed as well. This construction has at least the light modulator and the projection optics mounted at one end of an arm mounted on or above the projection surface, said arm preferably being swivelable, so that the distance from the projection surface is variable or adjustable.

As the light modulator, a reflective or transmissive LCD module may also be used, in which case correspondingly polarized light is used.

In an advantageous embodiment of the projection arrangement according to the invention, an extention of the optical axis of the projection optics meets the projection surface at an angle different from 90°, and the correcting unit additionally conducts a pre-distortion of the image data in such a manner that the distortion of the projected image caused by the oblique projection onto the projection surface is compensated. As a result, the distortion generated by an oblique projection is advantageously compensated as well, allowing to provide a very compact projection arrangement having little to, if possible, no distortion. The extention of the optical axis of the projection optics is tilted from a normal to the projection surface by 5–15° to vertical, but may also be up to 45°, with the maximum value being selected such that the losses in resolution are not clearly visible.

BRIEF DESCRIPTION OF THE DRAWINGS

The invention will be explained in more detail below, by way of example, with reference to the drawings, wherein.

DETAILED DESCRIPTION OF THE DRAWINGS

Figure 1:
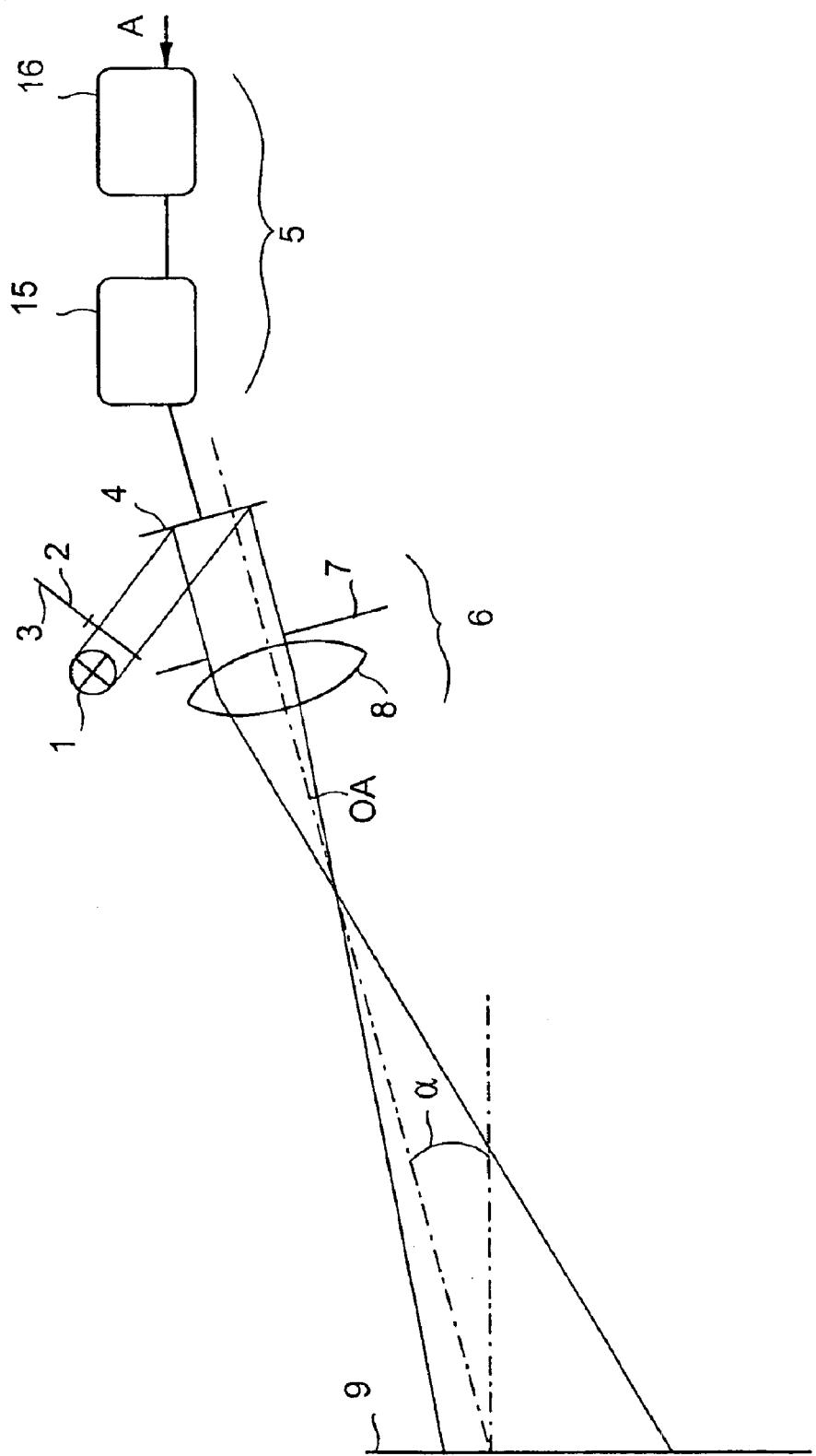
FIG. 1 shows a schematic view of the projection arrangement according to the invention.

The projection arrangement according to the invention schematically shown in FIG. 1 comprises a light source 1 (e.g. an arc lamp or a halogen lamp) emitting white light which impinges on a color wheel 3 arranged following the light source 1 and rotatable about an axis 2, which color wheel 3 comprises at least three segments, onto which the white light from the light source 1 is sequentially directed by rotating the color wheel 3 and which only transmit red, green and blue light, respectively, so that a light modulator 4 arranged following the color wheel 3 may be alternately illuminated with red, green and blue light. Alternatively, the color wheel may also comprise more than three segments, e.g. also an additional white segment, which transmits white light.

The light modulator 4 is a tilting mirror matrix 4 comprising a plurality of tilting mirrors arranged in lines and columns, which are tiltable back and forth between respective first and second tilted positions, indepently of each other, and can thus selectively reflect the light impinging on them at two different angles of tilt, so that an image modulated with regard to the angle of light reflection (partial color image) may be generated on the tilting mirror matrix.

In order to control the light modulator 4, the projection arrangement according to the invention contains a control device 5, which is supplied with the image data (arrow A) and which controls the light modulator 4, in order to generate the desired image, on the basis of these image data and, at the same time, as a function of the rotary position of the color wheel 3 and, thus, of the color of the light currently impinging on the light modulator 4.

The light modulator 4 is followed by projection optics 6, which, in the schematic representation of FIG. 1, contain a stop 7 and a lens 8 arranged following it. The stop 7 is provided and arranged such that the light reflected by the tilting mirrors which are in the first tilted position passes to the lens 8, while the light reflected by the tilting mirrors which are in the second tilted position impinges on the stop 7 and is cut off by it.

The light impinging on the lens 8 is projected by the latter onto a projection surface 9, so that the light reflected by the tilting mirrors in the first tilted position generates brightened image points, while the light reflected by the tilting mirrors in the second tilted position yields darkened image points. In order to generate, on the projection surface, an image point having a brightness lying between a brightened and a darkened image point, the corresponding tilting mirror may be tilted back and forth between the first and second tilted positions during the time period in which the image is generated by the tilting mirror matrix, such that the tilting mirror is in the first tilted position during a time segment of the time period which corresponds to the desired brightness.

As is evident from FIG. 1, the extention of the optical axis OA of the projection optics 6 meets the projection surface 9 at an angle α to the normal from of the projection surface 9, said angle α being 15° in this case. Further, the light modulator 4 is arranged in a decentered manner relative to the optical axis OA of the projection optics 6, such that the lower edge of the light modulator 4, as viewed in FIG. 1, is located below the optical axis OA and its upper edge is located above the optical axis. Thus, the optical axis passes through the light modulator, but not through the center of the light modulator.

Figure 2A:
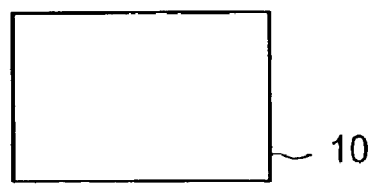
FIG. 2a shows a schematic view of the imaging area of the light modulator.

The tilting mirrors of the tilting mirror matrix are arranged in a rectangular area, so that the light modulator 4 comprises a rectangular image field 10, as represented in FIG. 2a. Said rectangular image field 10 should ideally be imaged onto the projection surface 9 as a rectangular image 11 (FIG. 2b).

Figure 2B:
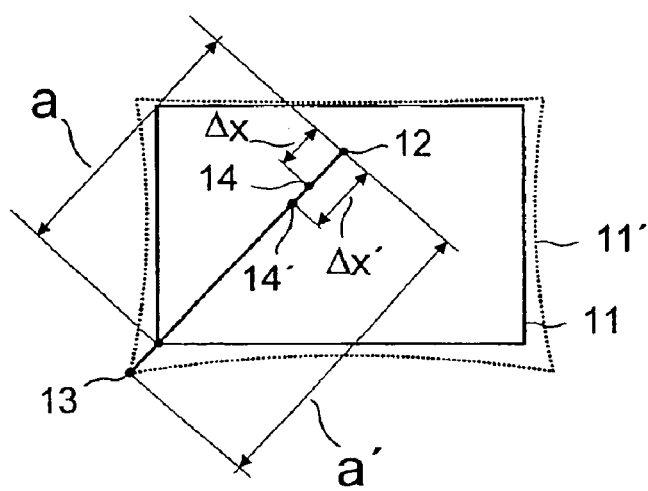
FIG. 2b shows a schematic view of an image formed in an undistorted manner and in a distorted manner, respectively.

FIG. 2b further shows, as a broken line, the distortion (residual distortion) caused by the projection optics 6, said distortion being shown for that case in which the extention of the optical axis perpendicularly meets the projection surface. In the example embodiment described herein, the residual distortion of the projection optics 6 is 10%, said residual distortion being determined as $((a'/\Delta x')/(a/\Delta x))-1$ in the case of perpendicular projection (a being the length of the diagonal expansion of the image from the point 12, in which the extention of the optical axis OA meets the projection surface 9, to a lower corner 13 of the projected image 11, and $\Delta x$ being the distance from the point 12 to its adjacent image point 14 on the diagonal expansion, and a' and $\Delta x'$ denoting the corresponding distances of the distorted projected image (FIG. 2b; the adjacent image point in the distorted projection is referred to as 14'). In the present description, the residual distortion of the perpendicular projection is thus defined according to the above formula.

Figure 2C:
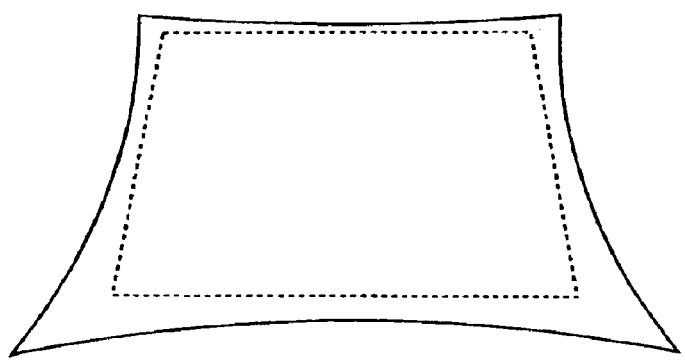
FIG. 2c shows a schematic view of an image formed in a distorted manner.

Due to the oblique projection onto the projection surface 9, there is also a linear distortion (so-called Keystone effect), which is shown by the broken line in FIG. 2c. Further, the projection optics 6, in this case wide-angle optics having an angle of field of 43°, also have the non-linear residual distortion described in connection with FIG. 2b, so that, during a projection, the projected image would have the distortions indicated by the solid line in FIG. 2c (without electronic correction).

In order to electrically compensate said distortion during imaging, the control device includes a correcting unit 16, in addition to the control unit 15, said correcting unit 16 processing the predetermined image data such that they are pre-distorted in a manner which is exactly the opposite of the optical distortion. The correcting unit delivers the pre-distorted image data to the control unit 15, which controls the light modulator 4 on the basis of these image data.

Figure 3A:
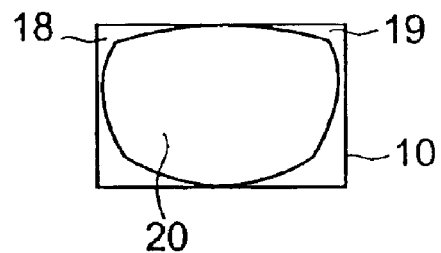
FIG. 3a shows a schematic view of the imaging area of the light modulator.
Figure 3B:
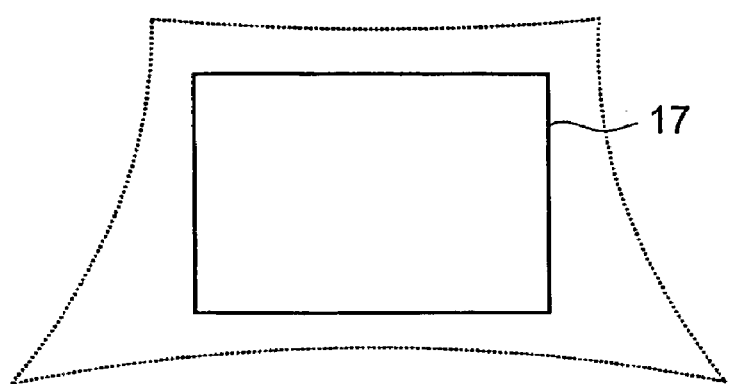
FIG. 3b shows a schematic view of the projected image with electronic compensation.

In order to pre-distort the predetermined image data accordingly, a desired image 17 is presumed on the projection surface 9, said desired image having a rectangular shape and being located within the distorted image shown in FIG. 2c (FIG. 3b). All image pixels of the tilting mirror matrix which are imaged outside of the desired image 17 by the projection optics 6, are darkened in the image data processing of the correcting unit 16. These are the areas 18 and 19 of the rectangular image field 10 of the light modulator 4, as shown in FIG. 3a. The remaining image pixels located in the area 20 of the image field 10 yield the rectangular image 17 shown in FIG. 3b, during imaging by means of the projection optics 6, with the correcting unit 16 re-sorting the image data accordingly and even omitting part of the image data (which results in a loss of resolution). Thus, compression or expansion occurs in the corresponding image portions on the light modulator. In the embodiment example described herein, the electronic correction leads to a loss of resolution of about 10 to 20%.

Thus, the projection optics 6 in the projection arrangement according to the invention may have a residual distortion of 10%, and still, an undistorted rectangular image 17 is projected onto the projection surface 9. Since wide-angle objectives, as in the case of the present projection optics 6, require large lenses with large curvatures, in which an optical distortion correction is very complex and leads to large and heavy objectives, very much smaller, lighter and also more economically manufacturable projection optics 6 may be employed in the projection arrangement according to the invention.

Figure 4:
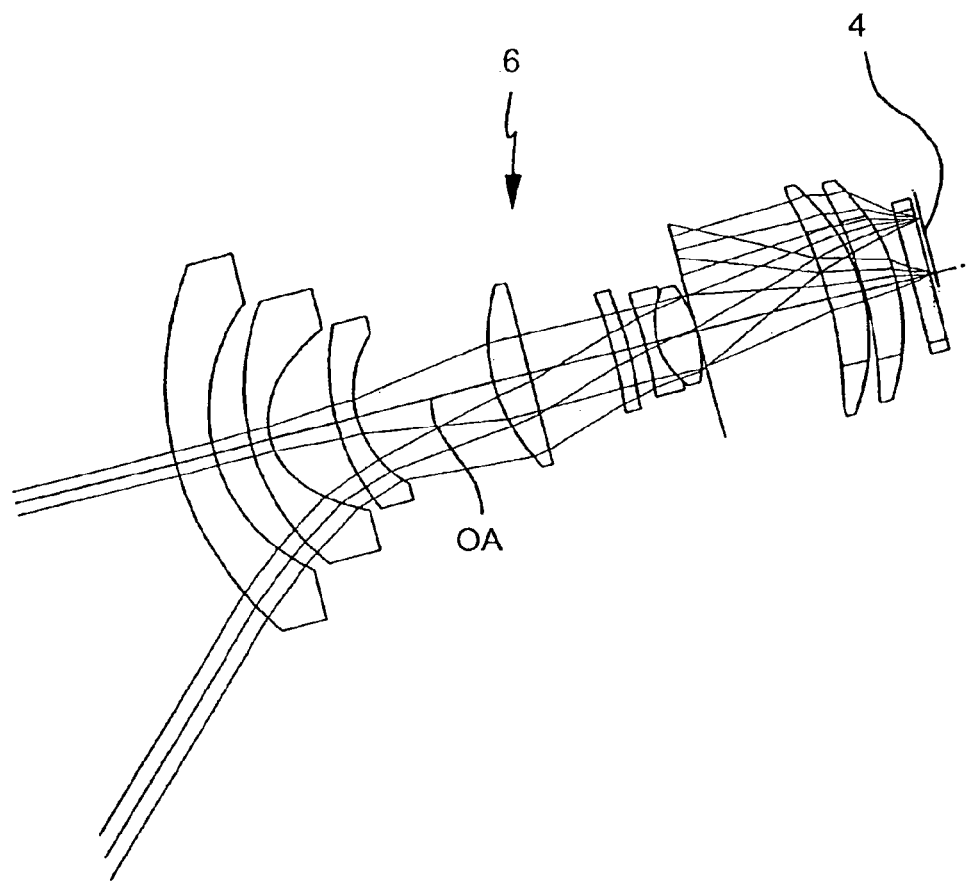
FIG. 4 shows a sectional view of the projection optics of the projection arrangement according to the invention.

FIG. 4 shows a sectional view of an embodiment of the projection optics 6, wherein the optical ray path of the light reflected by two image points of the light modulator 4 is shown, by way of example.

In a further embodiment of the arrangement according to the invention, it is also possible that the correcting unit 16 effects the pre-distortion for the different partial color images (in this case: red, green and blue partial color images) in such a manner that the transverse chromatic aberration (different color components of the same image point are projected onto the projection surface 9 not exactly overlying each other, but next to each other) is also compensated thereby.

What is claimed is:

1. A projection arrangement comprising:
   a light source;
   a light modulator, arranged following the light source and onto which light from the light source may be directed, said light being modulated by the light modulator under the control of a control device on the basis of predetermined image data, to generate an image;
   projection optics arranged following the light modulator for projecting said image onto a projection surface, wherein the control device comprises a control unit and a correcting unit, said correcting unit pre-distorting the predetermined image data such that a non-linear distortion caused by the projection optics is compensated, wherein said control unit controls the light modulator based on the pre-distorted image data, and wherein the rejection optics have a residual distortion of greater than or equal to two percent and of less than or equal to fifty percent.

2. The projection arrangement as claimed in claim 1, wherein the projection optics have a residual distortion of greater than or equal to ten percent and less than twenty five percent.

3. The projection arrangement as claimed in claim 1, wherein the projection optics are wide-angle optics having a field of greater than or equal to thirty five degrees.

4. The projection arrangement as claimed in claim 2, wherein the projection optics are wide-angle optics having a field of greater than or equal to thirty five degrees.

5. The projection arrangement as claimed in claim 1, wherein the light modulator comprises a rectangular image field, which is decentered relative to the optical axis of the projection optics.

6. The projection arrangement as claimed in claim 5, wherein the light modulator comprises, within the rectangular image field, a plurality of image pixels, each of which are switchable to at least a first setting and a second setting and are controllable independently of each other, with an image point associated with each image pixel being a bright image point when the image pixel is switched to the first setting and being a dark image point when the image pixel is switched to the second setting, and wherein the correcting unit pre-distorts the image data in such a manner that the image pixels which are imaged outside of a predetermined rectangular field of projection on the projection surface by the projection optics are switched to the second setting by the control unit.

7. The projection arrangement as claimed in claim 1, wherein the light source alternately directs light of a first color and light of a second color onto the light modulator, enabling the light modulator to generate images having a first color and a second color.

8. The projection arrangement as claimed in claim 7, wherein the correcting unit pre-distorts the predetermined image data for the image of the first color and for the image of the second color differently so as to compensate for lateral chromatic aberration of the projection optics.

9. The projection arrangement as claimed in claim 1, which is provided as a back projection arrangement.

10. The projection arrangement as claimed in claim 1, wherein an extension of an optical axis of the projection optics meets the projection surface at an angle different from ninety degrees and the correcting unit additionally pre-distorts the predetermined image data in such a manner that the distortion of the projected image caused by the oblique projection onto the projection surface is compensated.

11. A method of correcting for optical distortion of a projection lens arrangement comprising the steps of:
  directing light from a light source onto a light modulator, arranged following the light source
  modulating said light with the light modulator under the control of a control device on the basis of predetermined image data to generate an image when the control device comprises a control unit and a correcting unit;
  projecting the image through projection optics arrange following the light modulator to project said image onto a projection surface;
  pre-distorting the predetermined image data with said correcting unit; and
  controlling the light modulator with the pre-distorted image data so as to create a pre-distorted image such that a non-linear distortion caused by the projection optics is compensated, further comprising the step of configuring the light modulator to include a rectangular image field and decentering the rectangular image field relative to the optical axis of the projection optics.

12. The method as claimed in claim 11, further comprising the step of switching all pixels imaged outside of a predetermined rectangular field of projection of the pro-distorted image to a dark setting.

13. The method as claimed in claim 11, further comprising the step of alternately directing light of a first color and light of a second color and the light modulator, enabling the light modulator to generate images having a first color and a second color.

14. The method as claimed in claim 13, further comprising the step of pro-distorting the predetermined image data for the image of the first color and for the image of the second color differently so as to compensate for lateral chromatic aberration of the projection optics.

15. The method as claimed in claim 11, wherein an extension of an optical axis of the projection optics meets the projection surface at an angle different from ninety degrees and further comprising the step of pre-distorting the predetermined image data in such a manner that the distortion of the projected image caused by the oblique projection onto the projection surface is compensated.

16. A projection arrangement comprising:
  a light source;
  a light modulator, arranged following the light source and onto which light from the light source may be directed, said light being modulated by the light modulator under the control of a control device on the basis of predetermined image data, to generate an image; and
  projection optics arranged following the light modulator for projecting said image onto a projection surface, wherein the control device comprises a control unit and a correcting unit, said correcting unit pro-distorting the predetermined image data such that a non-linear distortion caused by the projection optics is compensated, wherein said control unit controls the light modulator based on the pre-distorted image data and the projection optics are wide-angle optics having a field of greater than or equal to thirty five degrees.

* * * * *

UNITED STATES PATENT AND TRADEMARK OFFICE
CERTIFICATE OF CORRECTION

| | |
|---|---|
| PATENT NO. | : 6,935,751 B2 |
| APPLICATION NO. | : 10/479930 |
| DATED | : August 30, 2005 |
| INVENTOR(S) | : Gerd Rieche, Gundrun Schroeter and Ralph Mende |

It is certified that error appears in the above-identified patent and that said Letters Patent is hereby corrected as shown below:

Col. 6, line 35, delete "rejection" and insert --projection--

Signed and Sealed this

Ninth Day of January, 2007

JON W. DUDAS
*Director of the United States Patent and Trademark Office*